(12) United States Patent
Wang et al.

(10) Patent No.: US 11,500,680 B2
(45) Date of Patent: Nov. 15, 2022

(54) SYSTOLIC ARRAY-FRIENDLY DATA PLACEMENT AND CONTROL BASED ON MASKED WRITE

(71) Applicant: ALIBABA GROUP HOLDING LIMITED, Grand Cayman (KY)

(72) Inventors: Yuhao Wang, San Mateo, CA (US); Xiaoxin Fan, San Mateo, CA (US); Dimin Niu, San Mateo, CA (US); Chunsheng Liu, San Mateo, CA (US); Wei Han, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/857,797

(22) Filed: Apr. 24, 2020

(65) Prior Publication Data

US 2021/0334142 A1 Oct. 28, 2021

(51) Int. Cl.
*G06F 9/30* (2018.01)
*G06F 9/38* (2018.01)
*G06F 15/80* (2006.01)
*G06F 17/16* (2006.01)
*G06F 9/50* (2006.01)
*G06F 9/48* (2006.01)
*G06N 3/063* (2006.01)

(52) U.S. Cl.
CPC ........ *G06F 9/5027* (2013.01); *G06F 9/30134* (2013.01); *G06F 9/3851* (2013.01); *G06F 9/3893* (2013.01); *G06F 9/4812* (2013.01); *G06F 15/8046* (2013.01); *G06F 17/16* (2013.01); *G06N 3/063* (2013.01)

(58) Field of Classification Search
CPC .... G06F 15/8046; G06F 9/3893; G06F 17/16; G06F 9/30134; G06F 9/3032; G06F 7/76–785
USPC ............................................... 712/5, 19, 300
See application file for complete search history.

(56) References Cited

U.S. PATENT DOCUMENTS

| 5,590,350 | A | * | 12/1996 | Guttag | ........................ | G06F 7/57 345/501 |
| 5,651,121 | A | * | 7/1997 | Davies | ..................... | G06F 7/764 708/490 |
| 6,041,321 | A | * | 3/2000 | Fabbrizio | ................ | G06N 3/063 706/41 |
| 6,963,341 | B1 | * | 11/2005 | Mimar | ................. | G06F 15/8084 345/505 |

(Continued)

*Primary Examiner* — Shawn Doman
(74) *Attorney, Agent, or Firm* — Finnegan, Henderson, Farabow, Garrett & Dunner, LLP

(57) ABSTRACT

The present disclosure relates to an accelerator for systolic array-friendly data placement. The accelerator may include: a systolic array comprising a plurality of operation units, wherein the systolic array is configured to receive staged input data and perform operations using the staged input to generate staged output data, the staged output data comprising a number of segments; a controller configured to execute one or more instructions to generate a pattern generation signal; a data mask generator; and a memory configured to store the staged output data using the generated masks. The data mask generator may include circuitry configured to: receive the pattern generation signal from the controller, and, based on the received signal, generate a mask corresponding to each segment of the staged output data.

9 Claims, 15 Drawing Sheets

(56) References Cited

U.S. PATENT DOCUMENTS

| | | | |
|---|---|---|---|
| 10,572,225 B1* | 2/2020 | Ghasemi | G06N 3/08 |
| 2008/0114826 A1* | 5/2008 | Mejdrich | G06F 17/16 |
| | | | 708/523 |
| 2009/0037694 A1* | 2/2009 | Luick | G06F 9/30109 |
| | | | 712/204 |
| 2016/0335082 A1* | 11/2016 | Sadeh | G06F 9/3001 |
| 2017/0103312 A1* | 4/2017 | Henry | G06F 9/3001 |
| 2018/0005074 A1* | 1/2018 | Shacham | G06N 3/063 |
| 2019/0121837 A1* | 4/2019 | Azizi | G06N 3/082 |
| 2019/0311243 A1* | 10/2019 | Whatmough | G06N 3/063 |
| 2019/0340508 A1* | 11/2019 | Liu | G05B 13/027 |
| 2019/0379529 A1* | 12/2019 | Meyer | H04L 9/003 |
| 2019/0391811 A1* | 12/2019 | Garegrat | G06F 17/16 |
| 2020/0150926 A1* | 5/2020 | Connor | G06F 9/3001 |
| 2020/0210188 A1* | 7/2020 | Ould-Ahmed-Vall | |
| | | | G06F 9/30145 |
| 2020/0272596 A1* | 8/2020 | Narayanamoorthy | |
| | | | G06F 15/8023 |
| 2021/0034567 A1* | 2/2021 | Bringivijayaraghavan | |
| | | | G11C 7/1006 |
| 2021/0034958 A1* | 2/2021 | Sinha | G06F 9/46 |
| 2021/0049426 A1* | 2/2021 | Mudigere | G06N 3/082 |
| 2021/0089316 A1* | 3/2021 | Rash | G06F 9/3802 |
| 2021/0097403 A1* | 4/2021 | Park | G06N 3/0454 |
| 2021/0097641 A1* | 4/2021 | Iyer | G06F 9/4806 |
| 2021/0103793 A1* | 4/2021 | Huang | G06N 5/04 |

\* cited by examiner

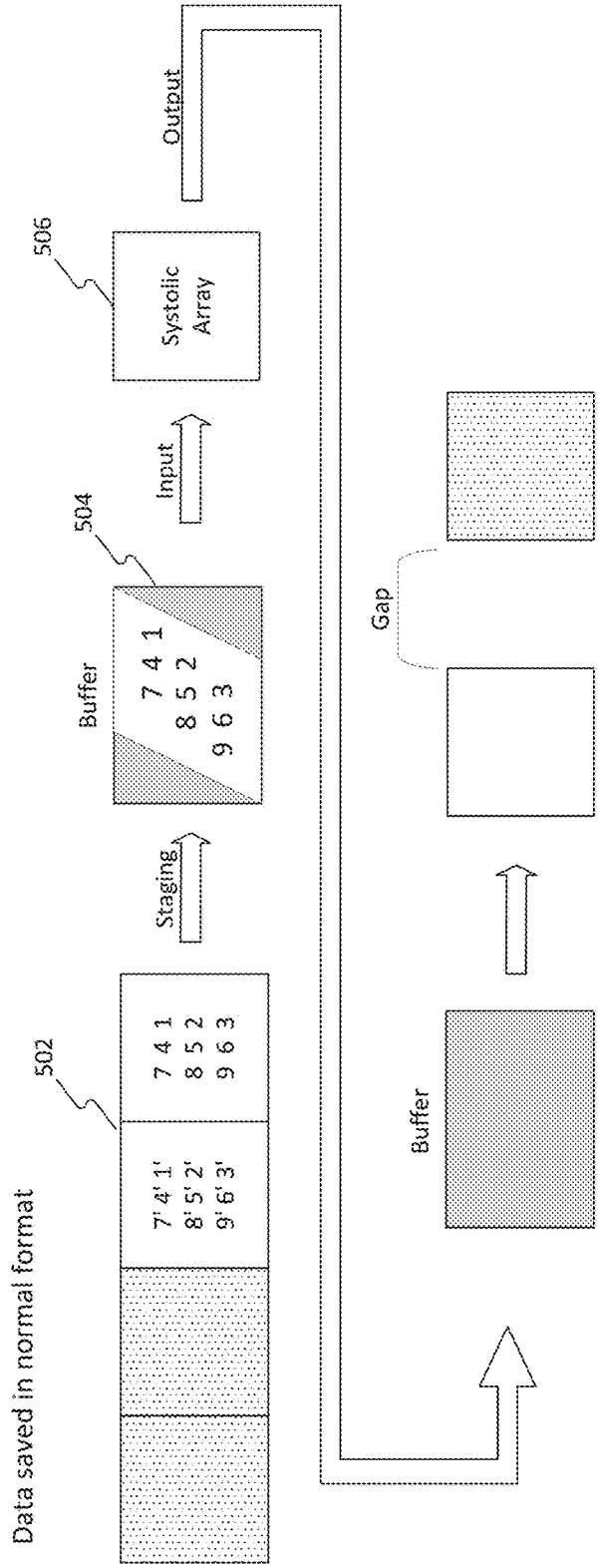
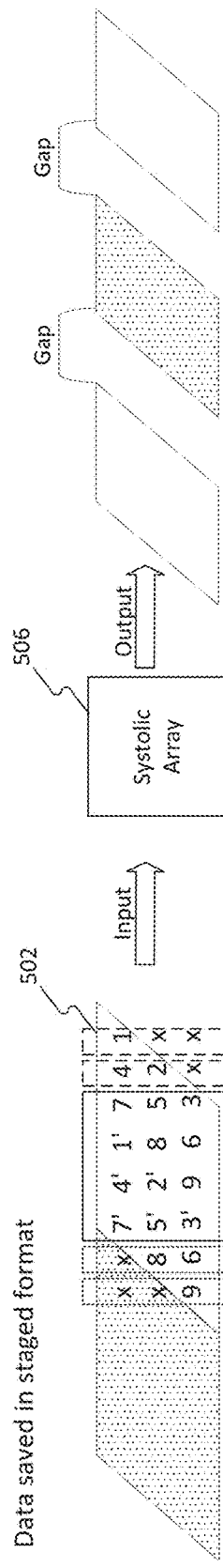
FIG. 5A
FIG. 5B

| | Stride = 1 | | Stride = 2 |
|---|---|---|---|
| Idle | 1111111111111111 | Idle | 1111111111111111 |
| For 2N-1 output data | 0000000000000001 | For N-1 output data | 0000000000000011 |
| For N+3 output data | 0001111111111111 | For N/2+3 output data | 0000111111111111 |
| For N+2 output data | 0011111111111111 | For N/2+2 output data | 0000111111111111 |
| For N+1 output data | 0111111111111111 | For N/2+1 output data | 0011111111111111 |
| For N output data | 1111111111111111 | For N/2 output data | 1111111111111111 |
| ... | ... | ... | ... |
| For 2 output data | 1110000000000000 | For 2 output data | 1111110000000000 |
| For 1 output data | 1100000000000000 | For 1 output data | 1111100000000000 |
| | 1000000000000000 | | 1100000000000000 |
| Idle | 1111111111111111 | Idle | 1111111111111111 |

FIG. 8

Output

| 1 x x | 4 2 x | 7 5 3 | x 8 6 | x x 9 | ... | a x x | b c x | d e f | x 9 7 | x x 3 |

1002

Typical Memory Transaction

| W | W | W | W | ... | R | W | R | W | R | W | R | W | R | W |

Improved Memory Transaction

| W | W | W | W | ... | W | W | W | W | W |

FIG. 10

SYSTOLIC ARRAY-FRIENDLY DATA PLACEMENT AND CONTROL BASED ON MASKED WRITE

BACKGROUND

Machine learning has been widely used in various areas. Convolutional neural network (CNN) is one type of a neural network widely applied on machine learning. CNNs are used in a variety of applications including image processing, speech recognition, game play, robotics, etc. Therefore, improving efficiency for processing CNNs is important to increase overall neural network execution performance.

Systolic arrays are a popular architecture for matrix-matrix multiplication. In order for a systolic array to perform matrix-matrix multiplication, both input matrices have to be staged to a particular format, which is usually done by line-buffers. However, line buffers are costly, and three may be required (two for input, and one for output). The overhead resulting from the line-buffers is within the same order of magnitude of systolic array itself. Removing the line-buffers may require the input data to be stored in memory with particular placement pattern. In certain applications, the intermediate output of last layer after general matrix multiply (GeMM) may need to maintain the same placement format as the input data, which is costly in terms of control and latency. Thus, there is a trade-off between the hardware cost of line-buffers (or equivalent module), or the cost of additional control and latency overhead.

SUMMARY OF THE DISCLOSURE

Embodiments of the present disclosure provide a system for systolic array-friendly data placement. An accelerator may include: a systolic array comprising a plurality of operation units, wherein the systolic array is configured to receive staged input data and perform operations using the staged input to generate staged output data, the staged output data comprising a number of segments; a controller configured to execute one or more instructions to generate a pattern generation signal; a data mask generator; and a memory configured to store the staged output data using the generated masks. The data mask generator may include circuitry configured to: receive the pattern generation signal from the controller, and, based on the received signal, generate a mask corresponding to each segment of the staged output data.

Additional features and advantages of the disclosed embodiments will be set forth in part in the following description, and in part will be apparent from the description, or may be learned by practice of the embodiments. The features and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

BRIEF DESCRIPTION OF THE DRAWINGS

FIG. 5A illustrates an example data saved in a typical format, consistent with embodiments of the present disclosure.

FIG. 5B illustrates an example of data saved in a staged format, consistent with embodiments of the present disclosure.

FIG. 8 illustrates an exemplary stride of a data mask module, consistent with embodiments of the present disclosure.

FIG. 10 illustrates exemplary memory transactions executed by a system implementing a systolic array, consistent with embodiments of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosed subject matter. Instead, they are merely examples of apparatuses and methods consistent with aspects related to the invention as recited in the appended claims.

Systolic array refers to a network of coupled processing units. Systolic arrays require data to be staged at input, e.g., such that each row of the systolic array receives data delayed by one clock cycle, and then to be transformed back to their original state at output. This is often done using staging buffers. However, staging buffers are large (e.g., $N^2/2$), and multiple staging buffers may be required, e.g., two staging buffers for an input and one staging buffer for an output, which is $1.5N^2$ in total. These staging buffers occupy a silicon area of a similar scale to the systolic array itself.

The embodiments of the present disclosure provide systolic-aware data placement, for example, by using masked writes to store merged output data in memory. Accordingly, the disclosed embodiments overcome the pitfalls associated with the use of staging buffers. For example, the disclosed embodiments may enable mask generation for systolic arrays during a general matrix multiplication (GeMM) computations without a staging buffer.

FIGS. 1 and 2A-2D provide a brief overview of convolutional neural networks and accelerator architectures.

Figure 1:
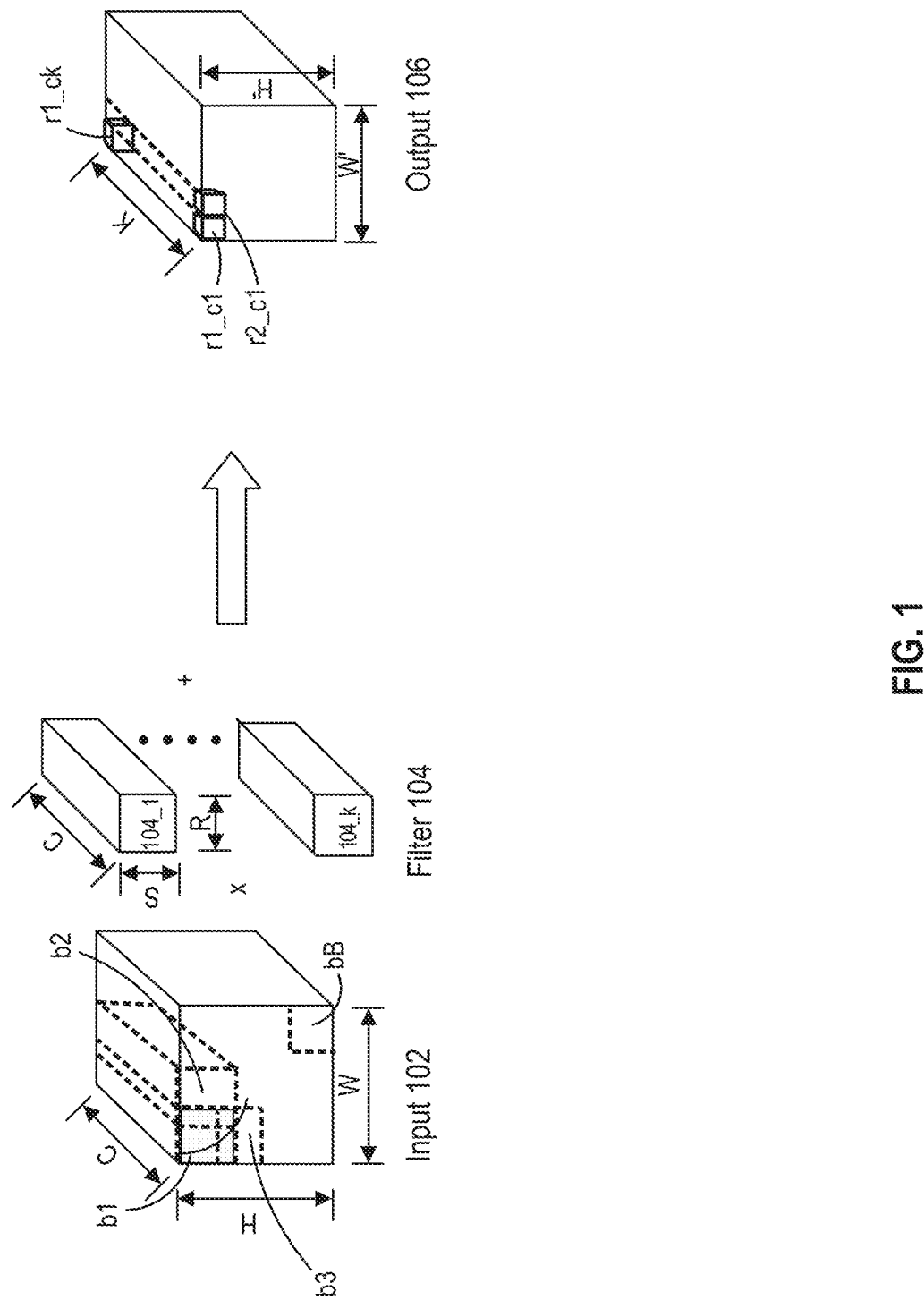
FIG. 1 illustrates an exemplary convolutional neural network (CNN) operation.

FIG. 1 illustrates an exemplary convolutional neural network (CNN) operation. In this exemplary operation, input data 102 such as activations are structured as a set of two-dimensional (2D) feature maps across a number (e.g., C) of channels. Each of the two-dimensional feature maps can be referred to as a channel. As shown in FIG. 1, input data 102 (e.g., an image) has C number of feature maps, and one channel of input data 102 has a size of H×W. Therefore, the size of the input data 102 can be H×W×C.

In FIG. 1, input data 102 can be convolved with a filter 104. Different feature maps of input data 102 may have different parameters such as weights, bias terms, etc. while one feature map can share the same parameters. Therefore, each filter 104 can have C number of channels corresponding to C number of feature maps of input data 102. Each channel of filter 104 can slide over a corresponding feature map of input data 102. As shown in FIG. 1, each channel of filter 104 has a size S×R, and the size of one filter 104 can be S×R×C. Here, a window sliding over input data 102 for a convolution operation can have the size S×R. In this example, input data 102 is convolved with K number of filters 104_1 to 104_k.

When a first channel of a first filter 104_1 slides on a first feature map of input data 102 for a convolution operation, the first channel of first filter 104_1 is multiplied to receptive fields such as b1 to b3 in the first feature map of input data 102. Receptive fields b1 to b3 can be defined to partially overlap with adjacent receptive fields. For example, first receptive field b1 partially overlaps with second receptive field b2 and third receptive field b3 as shown in FIG. 1. Receptive fields for the rest of feature maps of input data 102 can be defined corresponding to receptive fields of the first feature map. Therefore, each of first receptive field b1 to third receptive field b3 has C number of channels. When each feature map of input data 102 has B number of receptive fields, it can be considered that, in the present disclosure, the input data 102 comprises B number of work items each of which includes C number of channels for illustration purposes. Here, C channels of each work item can have a size corresponding to a size S×R of the receptive field.

One output value can be generated by multiplying first filter 104_1 with first receptive field b1 of input data 102 and by summing multiplication results for C number of channels. For example, first output value r1_c1 can be generated by multiplying each channel of first filter 104_1 and corresponding feature map in the first receptive field b1 of input data 102 and by summing multiplication results from C number of channels. By multiplying first filter 104_1 and second receptive field b2 of input data 102 channel by channel and by summing multiplication results for C number of channels, second output value r2_c1 can be generated. B number of output values including first output value r1_c1 and second output value r1_c2 generated by sliding first filter 104_1 over input data 102 can constitute a first channel of output data 106.

Similarly, B number of output values can be generated by convolving second filter 104_2 on input data 102 and can constitute a second channel of output data 106. B number of output values can also be generated by convolving $K^{th}$ filter 104_k on input data 102 and can constitute a $K^{th}$ channel of output data 106. For example, first output value r1_ck on the $K^{th}$ channel can be generated by multiplying each channel of $K^{th}$ filter 104_1 and corresponding feature map in the first receptive field b1 of input data 102 and by summing multiplication results for C number of channels. As shown in FIG. 1, output data 106 can have K number of channels corresponding to the number of filters 104 and each channel has a size of H'×W'. Therefore, the size of the output data 106 can be H'×W'×K. In this example, H'×W' can be equal to the number of work items of input data 102, i.e., B.

In some embodiments, output data 106 can be intermediate output data of a convolutional operation. In some embodiments, output data 106 can be further processed by other operations including element-wise operations to generate final output data for the convolutional operation. These convolutional operations may be converted to GeMM, which may be processed by a systolic array or accelerator architecture, as described in further detail below.

When executing a convolution operation, data for each receptive field such as b1 to b3 of input data 102 are fetched from on-chip or off-chip memory to a buffer memory for computation. As known from above, receptive fields b1 to b3 partially overlap with each other. Overlapped data among receptive fields b1 to b3 are conventionally fetched from on-chip memory or off-chip memory and stored to the buffer memory multiple times for a convolution operation, which causes buffer space deficiency or data transfer delay. Therefore, data reuse or share schemes for overlapped data among receptive fields b1 to b3 can be beneficial for improving overall system throughput by reducing data stored in the buffer or by minimizing data transfer bandwidth usage. Embodiments of the present disclosure can provide an accelerator enabling efficient processing of CNN operations. Embodiments of the present disclosure can also provide data reuse or share scheme suitable for executing CNN operations.

Figure 2A:
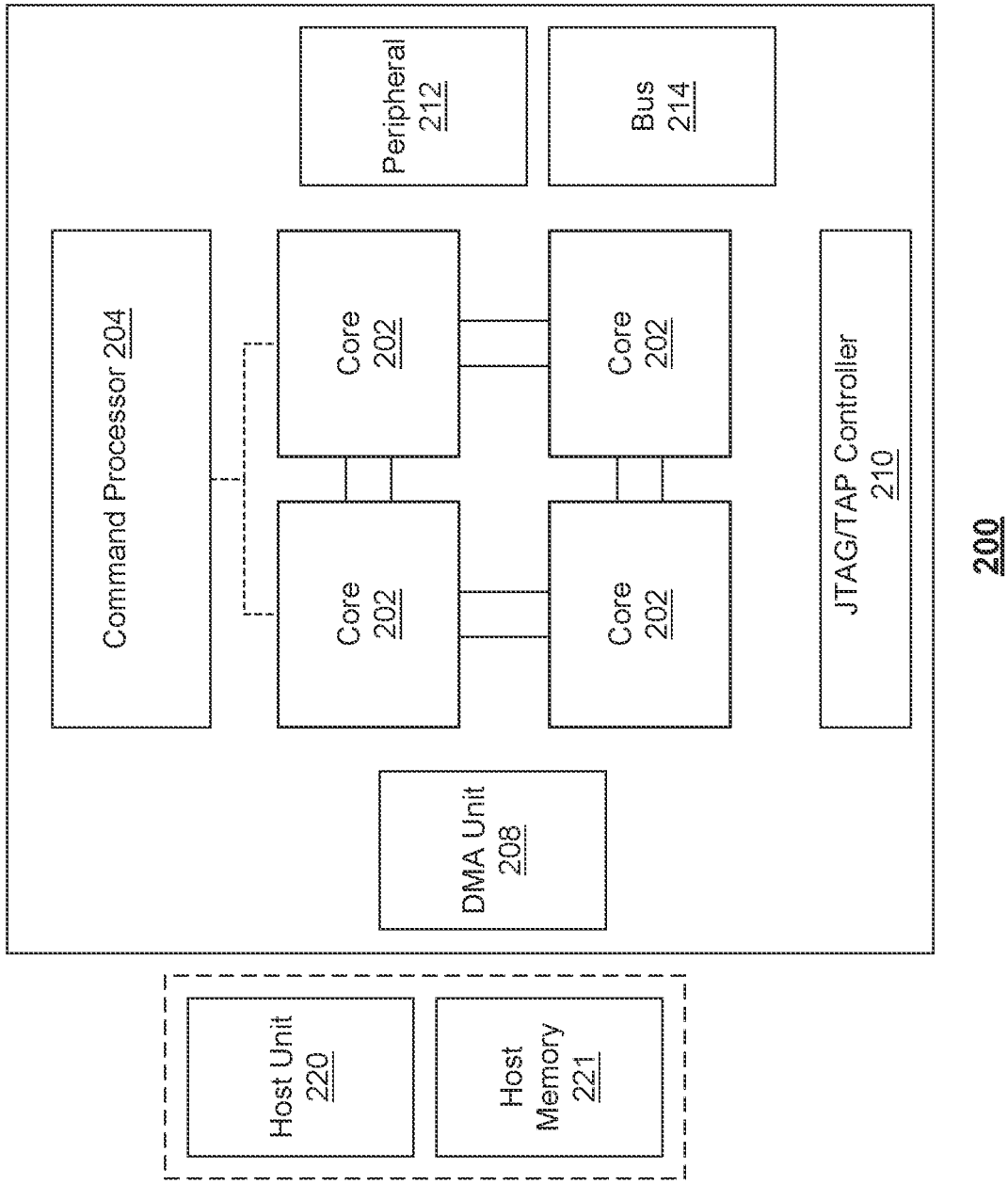
FIG. 2A illustrates an exemplary neural network accelerator architecture, consistent with embodiments of the present disclosure.

FIG. 2A illustrates an exemplary neural network accelerator architecture, consistent with embodiments of the present disclosure. In the context of this disclosure, a neural network accelerator may also be referred to as a machine learning accelerator or deep learning accelerator. In some embodiments, accelerator architecture 200 may be referred to as a neural network processing unit (NPU) architecture 200. As shown in FIG. 2A, accelerator architecture 200 can include a plurality of cores 202, a command processor 204, a direct memory access (DMA) unit 208, a Joint Test Action Group (JTAG)/Test Access End (TAP) controller 210, a peripheral interface 212, a bus 214, and the like.

It is appreciated that cores 202 can perform algorithmic operations based on communicated data. Cores 202 can include one or more processing elements that may include single instruction, multiple data (SIMD) architecture including one or more processing units configured to perform one or more operations (e.g., multiplication, addition, multiply-accumulate, etc.) based on commands received from command processor 204. To perform the operation on the communicated data packets, cores 202 can include one or more processing elements for processing information in the data packets. Each processing element may comprise any number of processing units. According to some embodiments of the present disclosure, accelerator architecture 200 may include a plurality of cores 202, e.g., four cores. In some embodiments, the plurality of cores 202 can be communicatively coupled with each other. For example, the plurality of cores 202 can be connected with a single directional ring bus, which supports efficient pipelining for large neural network models. The architecture of cores 202 will be explained in detail with respect to FIG. 2B.

Command processor 204 can interact with a host unit 220 and pass pertinent commands and data to corresponding core 202. In some embodiments, command processor 204 can interact with host unit under the supervision of kernel mode driver (KMD). In some embodiments, command processor 204 can modify the pertinent commands to each core 202, so that cores 202 can work in parallel as much as possible. The modified commands can be stored in an instruction buffer. In some embodiments, command processor 204 can be configured to coordinate one or more cores 202 for parallel execution.

DMA unit 208 can assist with transferring data between host memory 221 and accelerator architecture 200. For example, DMA unit 208 can assist with loading data or instructions from host memory 221 into local memory of cores 202. DMA unit 208 can also assist with transferring data between multiple accelerators. DMA unit 208 can allow off-chip devices to access both on-chip and off-chip memory without causing a host CPU interrupt. In addition, DMA unit 208 can assist with transferring data between components of accelerator architecture 200. For example, DMA unit 208 can assist with transferring data between multiple cores 202 or within each core. Thus, DMA unit 208 can also generate memory addresses and initiate memory read or write cycles. DMA unit 208 also can contain several hardware registers that can be written and read by the one or more processors, including a memory address register, a byte-count register, one or more control registers, and other types of registers. These registers can specify some combination of the source, the destination, the direction of the transfer (reading from the input/output (I/O) device or writing to the I/O device), the size of the transfer unit, or the number of bytes to transfer in one burst. It is appreciated that accelerator architecture 200 can include a second DMA unit, which can be used to transfer data between other accelerator architectures to allow multiple accelerator architectures to communicate directly without involving the host CPU.

JTAG/TAP controller 210 can specify a dedicated debug port implementing a serial communications interface (e.g., a JTAG interface) for low-overhead access to the accelerator without requiring direct external access to the system address and data buses. JTAG/TAP controller 210 can also have on-chip test access interface (e.g., a TAP interface) that implements a protocol to access a set of test registers that present chip logic levels and device capabilities of various parts.

Peripheral interface 212 (such as a PCIe interface), if present, serves as an (and typically the) inter-chip bus, providing communication between the accelerator and other devices.

Bus 214 (such as a I$^2$C bus) includes both intra-chip bus and inter-chip buses. The intra-chip bus connects all internal components to one another as called for by the system architecture. While not all components are connected to every other component, all components do have some connection to other components they need to communicate with. The inter-chip bus connects the accelerator with other devices, such as the off-chip memory or peripherals. For example, bus 214 can provide high speed communication across cores and can also connect cores 202 with other units, such as the off-chip memory or peripherals. Typically, if there is a peripheral interface 212 (e.g., the inter-chip bus), bus 214 is solely concerned with intra-chip buses, though in some implementations it could still be concerned with specialized inter-bus communications.

Accelerator architecture 200 can also communicate with a host unit 220. Host unit 220 can be one or more processing unit (e.g., an X86 central processing unit). As shown in FIG. 2A, host unit 220 may be associated with host memory 221. In some embodiments, host memory 221 may be an integral memory or an external memory associated with host unit 220. In some embodiments, host memory 221 may comprise a host disk, which is an external memory configured to provide additional memory for host unit 220. Host memory 221 can be a double data rate synchronous dynamic random-access memory (e.g., DDR SDRAM) or the like. Host memory 221 can be configured to store a large amount of data with slower access speed, compared to the on-chip memory integrated within accelerator chip, acting as a higher-level cache. The data stored in host memory 221 may be transferred to accelerator architecture 200 to be used for executing neural network models.

In some embodiments, a host system having host unit 220 and host memory 221 can comprise a compiler (not shown). The compiler is a program or computer software that transforms computer codes written in one programming language into instructions for accelerator architecture 200 to create an executable program. In machine learning applications, a compiler can perform a variety of operations, for example, pre-processing, lexical analysis, parsing, semantic analysis, conversion of input programs to an intermediate representation, initialization of a neural network, code optimization, and code generation, or combinations thereof. For example, the compiler can compile a neural network to generate static parameters, e.g., connections among neurons and weights of the neurons.

In some embodiments, host system including the compiler may push one or more commands to accelerator architecture 200. As discussed above, these commands can be further processed by command processor 204 of accelerator architecture 200, temporarily stored in an instruction buffer of accelerator architecture 200, and distributed to corresponding one or more cores (e.g., cores 202 in FIG. 2A) or processing elements. Some of the commands may instruct a DMA unit (e.g., DMA unit 208 of FIG. 2A) to load instructions and data from host memory (e.g., host memory 221 of FIG. 2A) into accelerator architecture 200. The loaded instructions may then be distributed to each core (e.g., core 202 of FIG. 2A) assigned with the corresponding task, and the one or more cores may process these instructions.

Figure 2B:
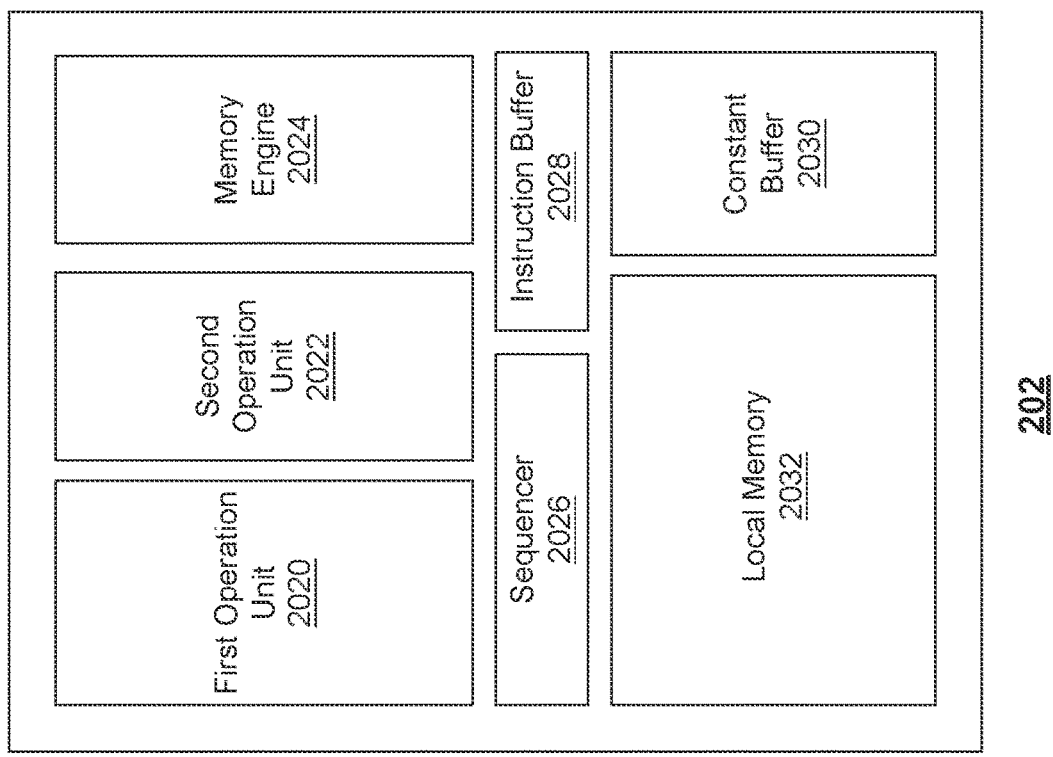
FIG. 2B illustrates an exemplary neural network accelerator core architecture, consistent with embodiments of the present disclosure.

It is appreciated that the first few instructions received by the cores 202 may instruct the cores 202 to load/store data from host memory 221 into one or more local memories of the cores (e.g., local memory 2032 of FIG. 2B). Each core 202 may then initiate the instruction pipeline, which involves fetching the instruction (e.g., via a sequencer) from the instruction buffer, decoding the instruction (e.g., via a DMA unit 208 of FIG. 2A), generating local memory addresses (e.g., corresponding to an operand), reading the source data, executing or loading/storing operations, and then writing back results.

According to some embodiments, accelerator architecture 200 can further include a global memory (not shown) having memory blocks (e.g., 4 blocks of 8 GB second generation of high bandwidth memory (HBM2)) to serve as main memory. In some embodiments, the global memory can store instructions and data from host memory 221 via DMA unit 208. The instructions can then be distributed to an instruction buffer of each core assigned with the corresponding task, and the core can process these instructions accordingly.

In some embodiments, accelerator architecture 200 can further include memory controller (not shown) configured to manage reading and writing of data to and from a specific memory block (e.g., HBM2) within global memory. For example, memory controller can manage read/write data coming from core of another accelerator (e.g., from DMA unit 208 or a DMA unit corresponding to another accelerator) or from core 202 (e.g., from a local memory in core 202). It is appreciated that more than one memory controller can be provided in accelerator architecture 200. For example, there can be one memory controller for each memory block (e.g., HBM2) within global memory.

Memory controller can generate memory addresses and initiate memory read or write cycles. Memory controller can contain several hardware registers that can be written and read by the one or more processors. The registers can include a memory address register, a byte-count register, one or more control registers, and other types of registers. These registers can specify some combination of the source, the destination, the direction of the transfer (reading from the input/output (I/O) device or writing to the I/O device), the size of the transfer unit, the number of bytes to transfer in one burst, or other typical features of memory controllers.

While accelerator architecture 200 of FIG. 2A can be used for convolutional neural networks (CNNs) in some embodiments of the present disclosure, it is appreciated that accelerator architecture 200 of FIG. 2A can be utilized in various neural networks, such as deep neural networks (DNNs), recurrent neural networks (RNNs), or the like. In addition, some embodiments can be configured for various processing architectures, such as neural network processing units (NPUs), graphics processing units (GPUs), field programmable gate arrays (FPGAs), tensor processing units (TPUs), application-specific integrated circuits (ASICs), any other types of heterogeneous accelerator processing units (HAPUs), or the like FIG. 2B illustrates an exemplary core architecture, consistent with embodiments of the present disclosure. As shown in FIG. 2B, core 202 can include one or more operation units such as first and second operation units 2020 and 2022, a memory engine 2024, a sequencer 2026, an instruction buffer 2028, a constant buffer 2030, a local memory 2032, or the like.

One or more operation units can include first operation unit 2020 and second operation unit 2022. First operation unit 2020 can be configured to perform operations on received data (e.g., matrices). In some embodiments, first operation unit 2020 can include one or more processing units configured to perform one or more operations (e.g., multiplication, addition, multiply-accumulate, element-wise operation, etc.). In some embodiments, first operation unit 2020 is configured to accelerate execution of convolution operations or matrix multiplication operations. An example of first operation unit 2020 will be explained with respect to FIG. 3 in detail.

Second operation unit 2022 can be configured to perform a pooling operation, an interpolation operation, a region-of-interest (ROI) operation, and the like. In some embodiments, second operation unit 2022 can include an interpolation unit, a pooling data path, and the like.

Memory engine 2024 can be configured to perform a data copy within a corresponding core 202 or between two cores. DMA unit 208 can assist with copying data within a corresponding core or between two cores. For example, DMA unit 208 can support memory engine 2024 to perform data copy from a local memory (e.g., local memory 2032 of FIG. 2B) into a corresponding operation unit. Memory engine 2024 can also be configured to perform matrix transposition to make the matrix suitable to be used in the operation unit.

Sequencer 2026 can be coupled with instruction buffer 2028 and configured to retrieve commands and distribute the commands to components of core 202. For example, sequencer 2026 can distribute convolution commands or multiplication commands to first operation unit 2020, distribute pooling commands to second operation unit 2022, or distribute data copy commands to memory engine 2024. Sequencer 2026 can also be configured to monitor execution of a neural network task and parallelize sub-tasks of the neural network task to improve efficiency of the execution. In some embodiments, first operation unit 2020, second operation unit 2022, and memory engine 2024 can run in parallel under control of sequencer 2026 according to instructions stored in instruction buffer 2028.

Instruction buffer 2028 can be configured to store instructions belonging to the corresponding core 202. In some embodiments, instruction buffer 2028 is coupled with sequencer 2026 and provides instructions to the sequencer 2026. In some embodiments, instructions stored in instruction buffer 2028 can be transferred or modified by command processor 204.

Constant buffer 2030 can be configured to store constant values. In some embodiments, constant values stored in constant buffer 2030 can be used by operation units such as first operation unit 2020 or second operation unit 2022 for batch normalization, quantization, de-quantization, or the like.

Local memory 2032 can provide storage space with fast read/write speed. To reduce possible interaction with a global memory, storage space of local memory 2032 can be implemented with large capacity. With the massive storage space, most of data access can be performed within core 202 with reduced latency caused by data access. In some embodiments, to minimize data loading latency and energy consumption, SRAM (static random access memory) integrated on chip can be used as local memory 2032. In some embodiments, local memory 2032 can have a capacity of 192 MB or above. According to some embodiments of the present disclosure, local memory 2032 be evenly distributed on chip to relieve dense wiring and heating issues.

Figure 2C:
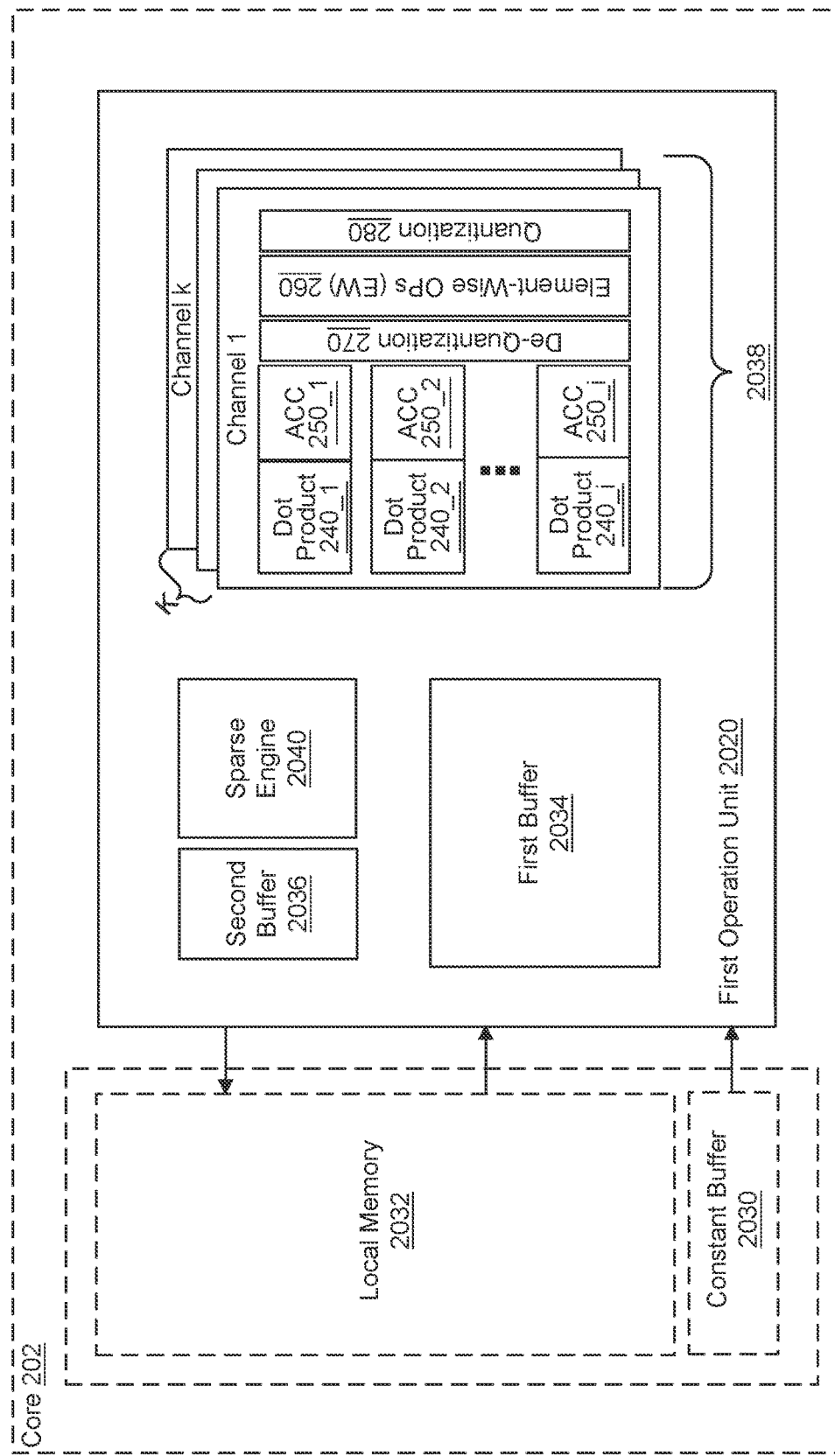
FIG. 2C illustrates an exemplary operation unit, consistent with embodiments of the present disclosure.

FIG. 2C is a schematic representation of an exemplary operation unit configuration 2020, according to some embodiments of the present disclosure. Operation unit 2020 can include a first buffer 2034, a second buffer 2036, and a processing array 2038.

First buffer 2034 can be configured to store input data. In some embodiments, data stored in first buffer 2034 can be input data (e.g., input features) to be used in processing array 2038 for execution. In some embodiments, the input data can be fetched from local memory 2032. First buffer 2034 can be configured to support reuse or share of data to be used in processing array 2038. In some embodiments, input data stored in first buffer 2034 can be activation data for a convolution operation.

Second buffer 2036 can be configured to store matrix data, such as a representation of sparse matrix (e.g., weight matrix). For example, operation unit 2020 can read, fetch or receive the representation from local memory 2032 through a memory engine (not shown, e.g., memory engine 2024 of FIG. 2B), and store the representation in second buffer 2036. In some embodiments, second buffer 2036 can be a part of or separate from first buffer 2034. Second buffer 2036 can be any suitable memory that provides storage space for data such as matrix or representation, such as a register, Dynamic Random Access Memory (DRAM), Static Random Access Memory (SRAM), or the like.

Operation unit 2020 can also include a sparse engine 2040 communicatively coupled with second buffer 2036 and configured to read data from or write data to second buffer 2036. Sparse engine 2040 may include one or more decompressors, such as a first level decompressor and a second level decompressor, to decompress the representation. In some embodiments, sparse engine 2040, which may include a first level decompressor or second level decompressor can be implemented as a circuitry with high processing speed. Sparse engine 2040 can read a representation of a sparse matrix in a neural network from second buffer 2036. In some embodiments, the representation can also include one or more sub-level BMs. Decompressors of sparse engine 2040 can include circuitry to communicatively couple them and allow them to cooperate with each other to decompress the representation. For example, a first level decompressor and a second level decompressor can be coupled and communicate with each other.

Operation unit 2020 can also include processing array 2038 that can have a plurality of layers (e.g., K layers). According to some embodiments of the present disclosure, each layer of processing array 2038 can include a plurality of processing strings, which may perform computations in parallel. For example, first processing string included in the first layer of processing array 2038 can comprise a first multiplier (e.g., dot product) 240_1 and a first accumulator (ACC) 250_1 and second processing string can comprise a second multiplier 240_2 and a second accumulator 250_2. Similarly, $i^{th}$ processing string in the first layer can comprise an $i^{th}$ multiplier 240_i and an $i^{th}$ accumulator 250_i.

In some embodiments, processing array 2038 can perform computations under SIMD control. For example, when performing a convolution operation, each layer of processing array 2038 can execute same instructions with different data.

According to some embodiments of the present disclosure, processing array 2038 shown in FIG. 2C can be included in a core (e.g., core 202 in FIG. 2A or FIG. 2B). When a number of processing strings (e.g., i number of processing strings) included in one layer of processing array 2038 is smaller than a number of work items (e.g., B number of work items), i number of work items can be executed by processing array 2038 and subsequently the rest of work items (B-i number of work items) can be executed by the processing array 2038 in some embodiments. In some other embodiments, i number of work items can be executed by processing array 530 and the rest of work items can be executed by another processing array 2038 in another core.

According to some embodiments of the present disclosure, processing array 2038 can further include an element-wise operation processor (OP) 260. In some embodiments, element-wise operation processor 260 can be positioned at the end of processing strings. In some embodiments, processing strings in each layer of processing array 2038 can share element-wise operation processor 260. For example, i number of processing strings in the first layer of processing array 2038 can share element-wise operation processor 260. In some embodiments, element-wise operation processor 260 in the first layer of processing array 2038 can perform its element-wise operation on each of output values, from accumulators 250_1 to 250_i, sequentially. Similarly, element-wise operation processor 260 in the Kth layer of processing array 2038 can perform its element-wise operation on each of output values, from accumulators 250_1 to 250_i, sequentially. In some embodiments, element-wise operation processor 260 can be configured to perform a plurality of element-wise operations. In some embodiments, element-wise operation performed by the element-wise operation processor 260 may include an activation function such as ReLU function, ReLU6 function, Leaky ReLU function, Sigmoid function, Tanh function, or the like.

In some embodiments, multiplier 240 or accumulator 250 may be configured to perform its operation on different data type from what the element-wise operation processor 260 performs its operations on. For example, multiplier 240 or accumulator 250 can be configured to perform its operations on integer type data such as Int 8, Int 16, and the like and element-wise operation processor 260 can perform its operations on floating point type data such as FP24, and the like. Therefore, according to some embodiments of the present disclosure, processing array 2038 can further include de-quantizer 270 and quantizer 280 with element-wise operation processor 260 positioned therebetween. In some embodiments, batch normalization operations can be merged to de-quantizer 270 because both de-quantizer 270 and batch normalization operations can be performed by multiplication operations and addition operations with constants, which can be provided from constant buffer 2030. In some embodiments, batch normalization operations and de-quantization operations can be merged into one operation by compiler. As shown in FIG. 2C, constant buffer 2030 can provide constants to de-quantizer 270 for de-quantization or batch normalization.

Sparse engine 2040 can provide a decompressed sparse matrix to processing array 2038, and processing array 2038 can perform a computation (e.g., addition, multiplication, multiply-accumulate, convolution, or the like) on the decompressed sparse matrix. In some embodiments, processing array 2038 can read input features from first buffer 2034 and use them in a computation.

Figure 2D:
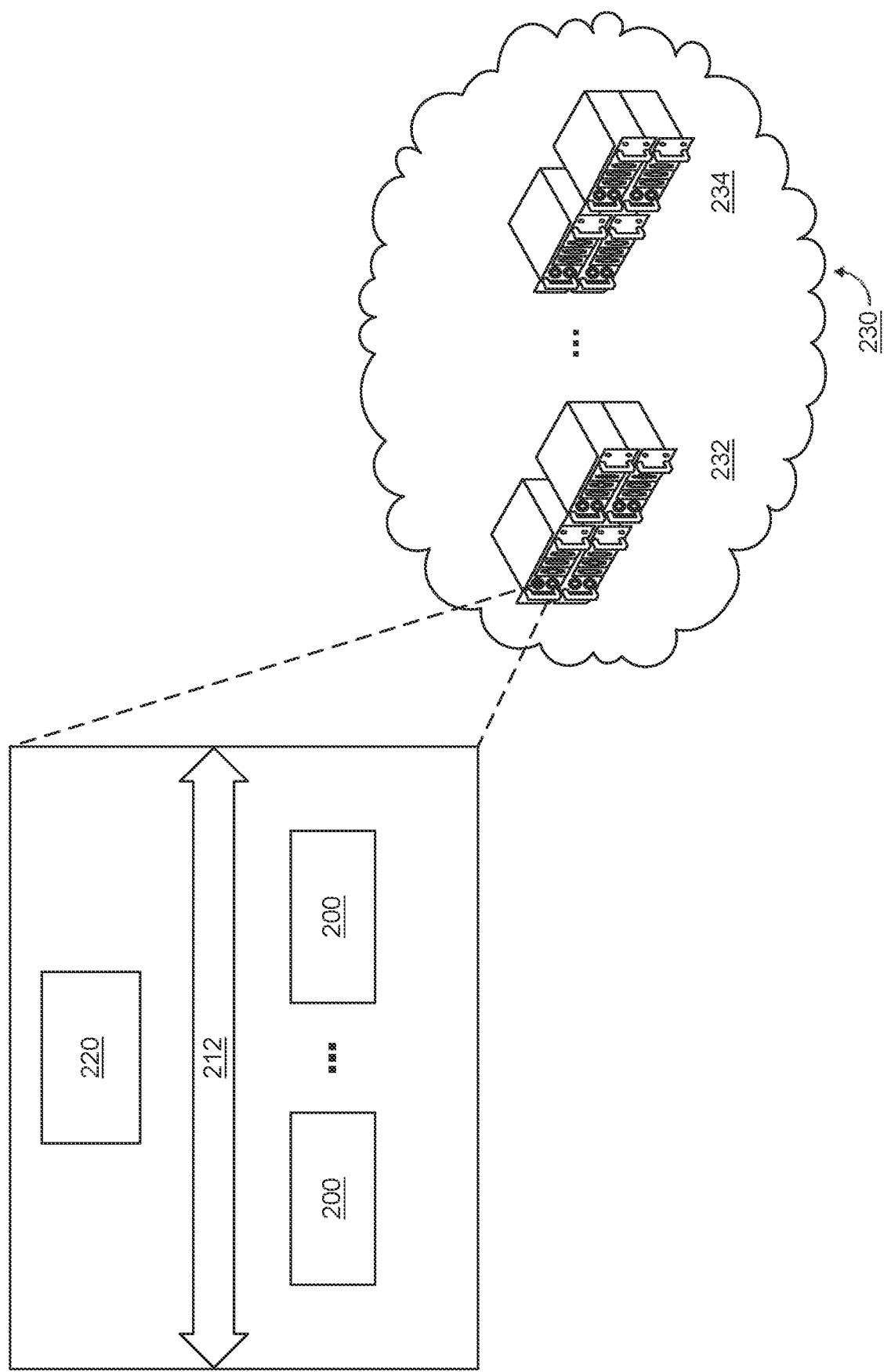
FIG. 2D illustrates a schematic diagram of an exemplary cloud system incorporating a neural network accelerator, consistent with embodiments of the present disclosure.

FIG. 2D illustrates a schematic diagram of an exemplary cloud system incorporating accelerator architecture 200, consistent with embodiments of the present disclosure. As shown in FIG. 2D, cloud system 230 can provide a cloud service with artificial intelligence (AI) capabilities and can include a plurality of computing servers (e.g., 232 and 234). In some embodiments, a computing server 232 can, for example, incorporate a neural network accelerator architecture 200 of FIG. 2A. Neural network accelerator architecture 200 is shown in FIG. 2D in a simplified manner for simplicity and clarity.

With the assistance of neural network accelerator architecture 200, cloud system 230 can provide the extended AI capabilities of image recognition, facial recognition, translations, 3D modeling, and the like. It is appreciated that, neural network accelerator architecture 200 can be deployed to computing devices in other forms. For example, neural network accelerator architecture 200 can also be integrated in a computing device, such as a smart phone, a tablet, and a wearable device.

Figure 3:
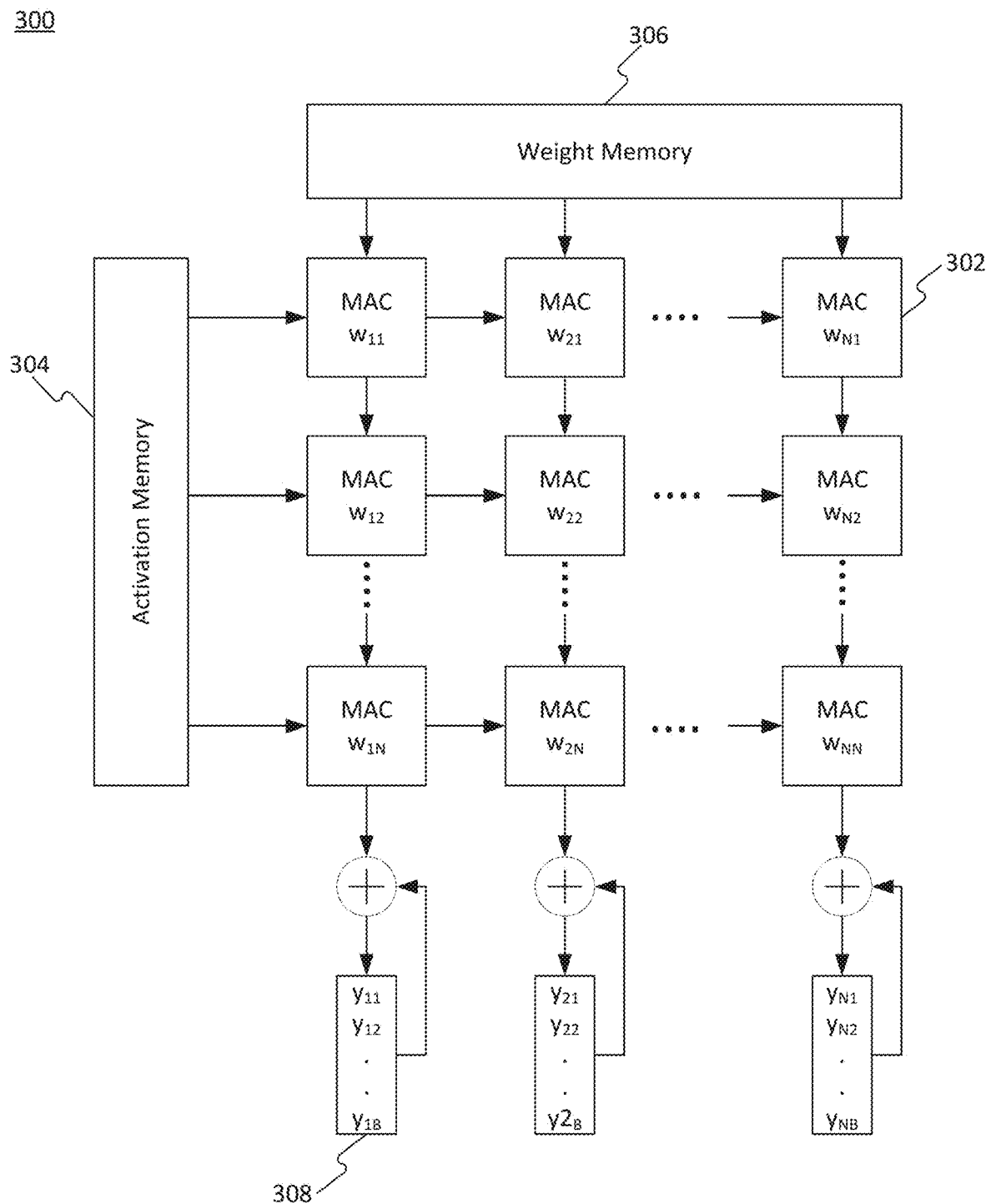
FIG. 3 illustrates an exemplary systolic array, consistent with embodiments of the present disclosure.

FIG. 3 illustrates an exemplary systolic array-based accelerator. As described above, such a configuration may be used to facilitate operations of convolutional neural networks. The systolic array 300 may include an N×N array of multiply-and-accumulate (MAC) units 302 configured to execute a matrix multiplication. In some embodiments, MAC units 302 may be part of one or more operation units (e.g., first operation 2020 of FIG. 2B), which can perform multiply and accumulate operations (e.g., via various output channels 1-k of processing array 2038, shown in FIG. 2C). Activation memory 304 (e.g., first buffer 2034 shown in FIG. 2C) may store an activation matrix, which may be fed into each row of the systolic array at a rate of one row per clock cycle. In some embodiments, each row may receive activation data offset by one clock cycle. Weight memory 306 (e.g., second buffer 2036, shown in FIG. 2C) may store a weight matrix, which may be preloaded into the array and remains stationary throughout the computation.

Each MAC unit 302 may receive the result of a calculation performed by its neighboring units, perform an operation using the result, and communicate the result of the operation to its neighbors. For example, a MAC unit may receive numbers from its neighbors, perform one or more calculations, and then pass the result its right-side or lower neighbors. In a first clock cycle, MAC units 302 may receive an activation stream. For example, $MAC_{11}$ may compute $w_{11}a_{11}$. In a second clock cycle, $MAC_{12}$ may compute $w_{12}a_{12}$, which is added to the result of $w_{11}a_{11}$ by an accumulator 308. In the Nth clock cycle, a $MAC_{1N}$ may output a result $y_{11}=\Sigma_i w_{1i}a_{1i}$, where i indicates the $i^{th}$ row of the weight matrix and where $y_{11}$ is the first element in an output matrix stored by accumulator 308. After the matrix multiplication of the activation matrix and weight matrix is complete, an activation function may be applied to the output matrices stored in the accumulators 308.

In the implementation of a systolic array as described with reference to FIG. 3, the input data (e.g., the activation matrix and weight matrix) must be staged prior to being operated on by the systolic array. That is, the input data must follow a pattern in order to yield an accurate calculation. For example, systolic arrays used to do matrix multiplication require the input to follow a particular pattern. If the input is in the form of a matrix, each row and each column may need to be shifted, such that, for example, the second row of the input matrix is delayed by one cycle, the third row is delayed by two cycles, and so on. This is often accomplished by using staging buffers (e.g., line buffers) to stage both the weight and activation data, as well as the output data. The staging buffer may delay the input data, e.g., by a clock cycle, thereby staggering the input data. Often, the data may be stored in the staged format prior to being fed into a systolic array. The use of staging buffers is costly and inefficient, as described below with reference to FIG. 4.

Figure 4:
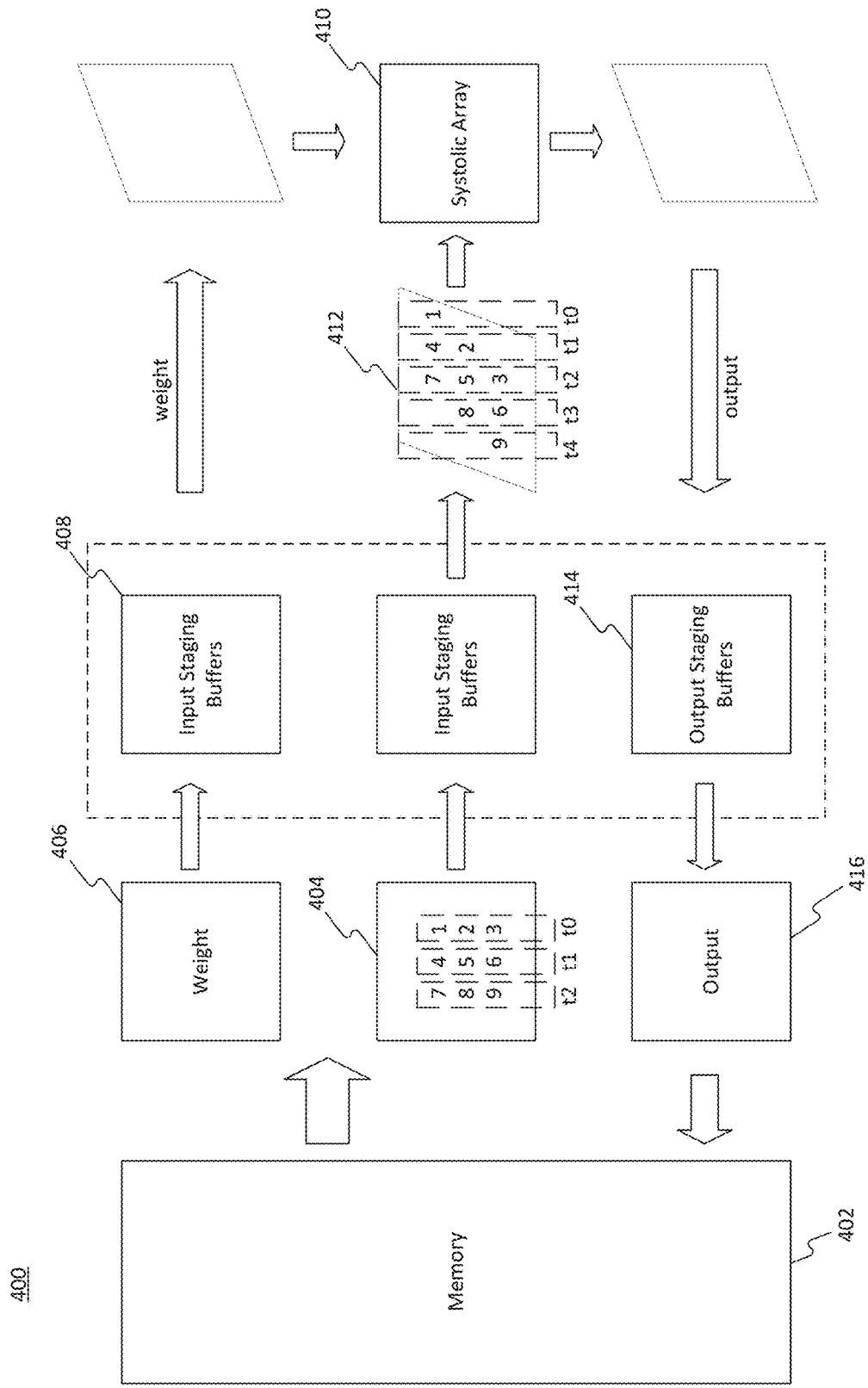
FIG. 4 illustrates a flow diagram of an exemplary process for performing operations using a systolic array, consistent with embodiments of the present disclosure.

FIG. 4 illustrates a conventional operation of a systolic array by method of staging input data, e.g., by using a staging buffer. In FIG. 4, both weight, activation, and output memories are represented by memory 402. Memory 402 may be accelerator memory or host memory. In system 400, data, e.g., activation data 404 and weight data 406, may be sent from memory 402 to an input staging buffer 408. Staging buffer 408 may receive activation data 404 in a series of clock cycles, denoted as t0, t1, and t2.

Each input buffer 408 may act upon received data to stage the data into a format compatible with systolic array 410. For example, with respect to activation data 404, input buffer 408 may stagger the data, such that the data received by systolic array 410 is offset by one clock cycle. Thus, activation data 404 may be staggered across four clock cycles as illustrated by staged data 412. The same staging process occurs for the weight data 406. The staged weight and input data may be received by systolic array 410, which may be configured to perform an operation, e.g., matrix multiplication, on the received data to generate output data, as described above with reference to FIG. 3.

An output staging buffer 414 may be configured to manipulate the data output as a result of the systolic array 410 performing a computation on the staged input data, thereby output data 416, which is data in its original, unstaged format. The formatted output data 416 may be stored in memory 402 for subsequent use in calculations.

FIGS. 5A and 5B provide another illustration of the issues associated with storing data for input into a systolic array. In FIG. 5A, the exemplary input data 502 is stored in a normal format. Data 502 may then be staged using a buffer 504 and input to systolic array 506. Systolic array 506 may output data, which is then operated on by an output staging buffer, e.g., output staging buffer 412, to un-stage the output matrix. Thus, the data may be saved in its original format, for example, with each address storing one column. Although there is a gap in the time domain between the two output matrices, they can be stored in sequence in memory and be accessed in sequence as an input matrix in subsequent operations. In some instances, the output matrix columns may not be stored in memory sequentially, but they can be accessed sequentially one column per cycle by nonconsecutive addresses.

FIG. 5B illustrates an implementation in which the input data 502 is stored in memory in a pre-staged format, which is directly inputted into systolic array 506. In this situation, staging buffers may be removed. The time domain gap in the output of systolic array 506 may be shifted, due to the pre-staged data, such that the gap cannot be removed. This is because each column contains valid values as well as placeholder values. Thus, the placeholder values must be stored in memory, which results in storage overhead. In addition, this method requires an additional process to remove the placeholder values prior to additional operations.

In the examples illustrated by both FIGS. 5A and 5B, problems arise from the fact that the output is not stored in the same format as the input. Thus, systems may not perform N×M*M×N GeMM operations consecutively. These systems are limited to N×N*N×N GeMM operations, resulting in a low utilization rate. Further, because gaps in data are stored in memory, these methods of storing output data are inefficient, storing unnecessary data.

Figure 6:
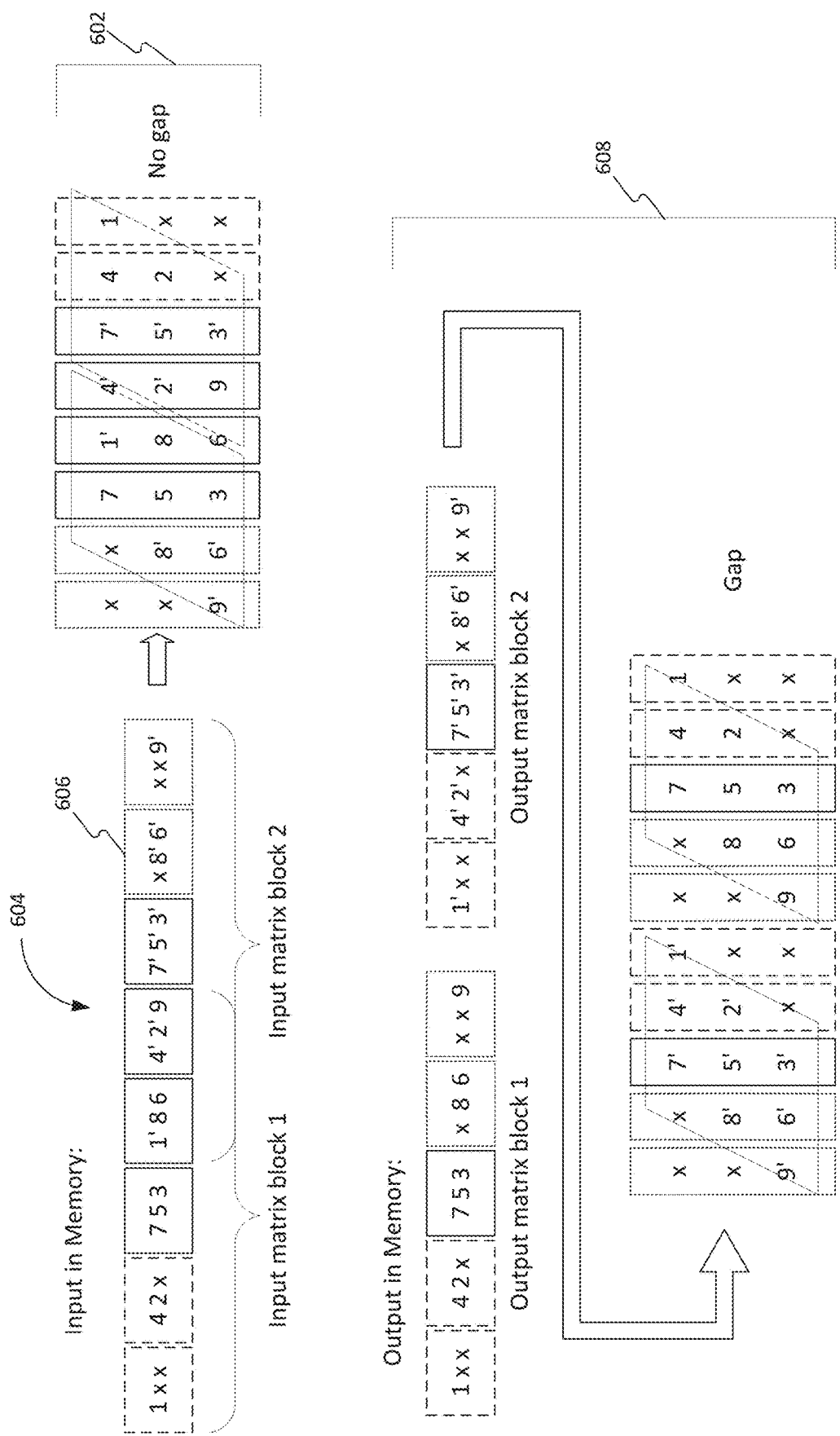
FIG. 6 illustrates the input and output in memory of a systolic array system.

FIG. 6 illustrates the deficiencies associated with removing the staging components from the system entirely, for example, by storing the input data in a pre-staged format. For example, process 602 illustrates an input string received from memory, e.g., memory 402. In the absence of staging buffers, the input data must be stored in a pre-staged format. Input string 604 may be comprised of two blocks, e.g., input matrix block 1 and input matrix block 2. Each segment 606 may represent a portion of input data that may correspond to an address in memory storing a portion of input string 604. For example, each segment may store one byte. In other embodiments, each segment may contain more than one byte of data, or any other amount of data. Input string 604 may be stored such that the data of each input block is shifted in order to reach the systolic array, e.g., array 410, at the appropriate clock cycle. Placeholder values are denoted here as "x."

Process 608 illustrates the output in memory of output matrix block 1 and output matrix block 2. Notably, the output is not stored in the same format as the input. The output may include several placeholder values, thus data efficiency using this method is low. In some examples, data efficiency may be lower in output memory than in input memory as the gap in the original data cannot be removed. This gap may be introduced as a result of the removal of the output staging buffer. For example, if output matrix 1 (N*N) is the output from a N*M*M*N GeMM, and output matrix 2 (N*N) is the output from another N*M*M*N GeMM; due to the removal of output staging buffer, the two output matrices will have placeholder values. In order to use the two output matrices as input for another N*2N, 2N*N GeMM operation, the placeholders will require special handling and additional processing. Accordingly, this method of storing data is associated with additional overhead costs due to the storage of the extraneous placeholder data.

The embodiments of the present disclosure address problems associated with both staging approaches for systolic arrays. For example, the embodiments of the present disclosure use masked writes to combine output matrices such that the output matrices may be merged and stored in memory. The merged output may then be used directly as the input for further matrix multiplication by the systolic array. Saving the masked output data enables this data to be merged and used for subsequent computations, thereby reducing the overhead and increasing the efficiency associated with operating a systolic array-based accelerator.

The embodiments of the present disclosure describe a systolic array friendly data placement and control method in which data are not stored in original format, but in a staged format. In some embodiments, systolic array output is written back to memory with data masks to merge with previous N×N data blocks. For example, a data mask module may receive a pattern generation signal from a controller and automatically generate mask bits for 2n−1 consecutive writes. The data mask generator may generate a data mask pattern according to the input from the controller to support different data formats, e.g., (int8, fp16, bf16, fp32, etc.).

Figure 7:
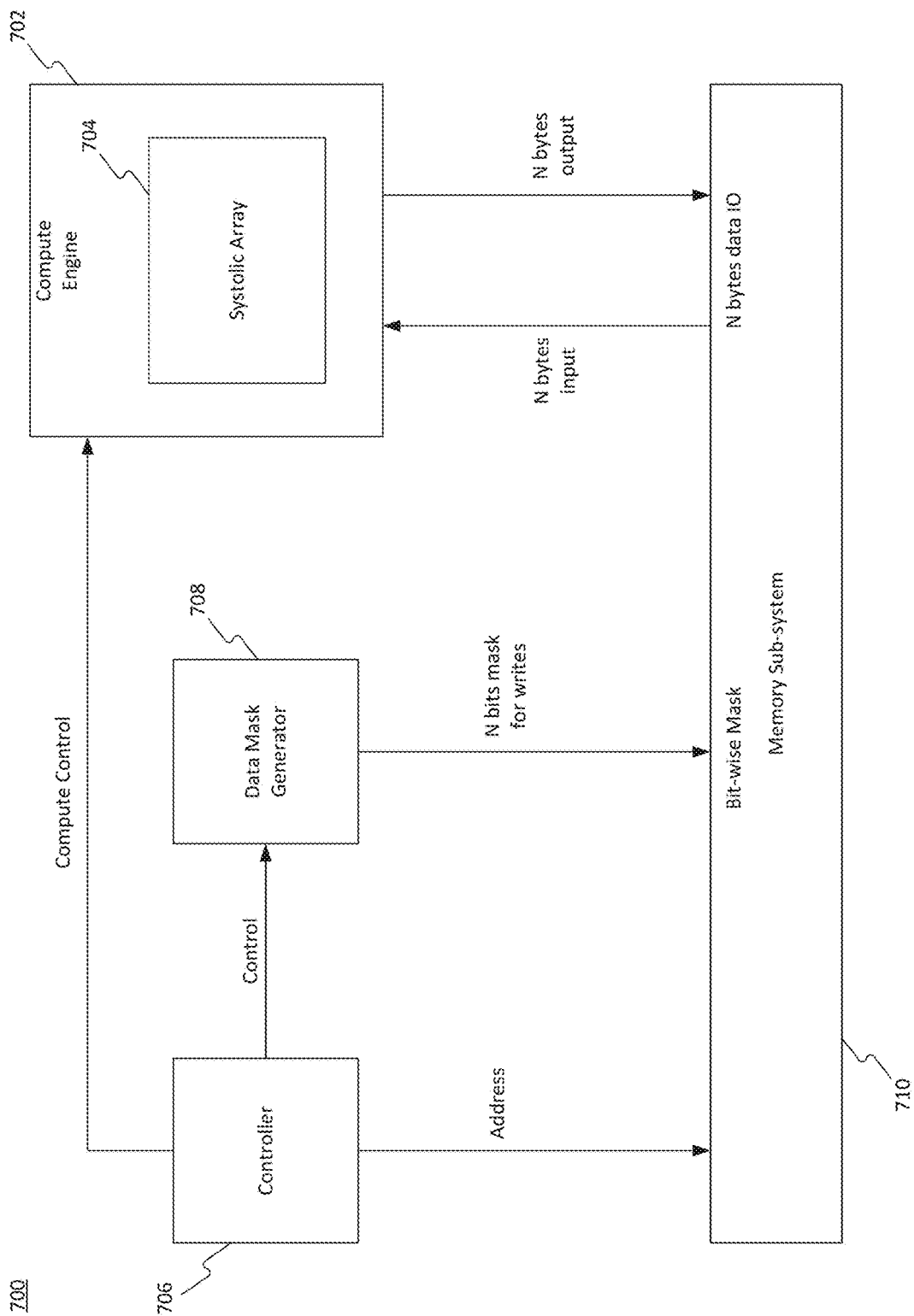
FIG. 7 illustrates an example a system implementing a systolic array, consistent with embodiments of the present disclosure.

FIG. 7 illustrates a block diagram of a system 700 for staging input data for a systolic array. The system 700 may include a compute engine 702 containing a systolic array 704, a controller 706, a data mask generator 708, and a memory sub-system 710. System 700 eliminates the overheard associated with traditional methods for storing staged input and output data and enables subsequent computations to be completed using output data, thereby increasing the utilization rate over the previously described systems.

Compute engine 702 may include systolic array 704 or other components, such as an accumulator. Systolic array 704 may be similar to systolic array 300, described with reference to FIG. 3. In the embodiments of the present disclosure, staging buffers may not be required to reshape input/output data of the compute engine 702.

Controller 706 may coordinate compute/memory and data mask module 708 during write operations. In the embodiments of the present disclosure, the controller 706 is a dedicated module. In other embodiments, controller 706 may be an external processor, for example, a CPU. Control sequences may be instructions, which are compiled before the run or determined at runtime based on the current GeMM operation. Accordingly, disclosed embodiments may be modified to accommodate a number of data formats.

Controller 706 may also communicate with Memory sub-system 710. Controller 706 may receive GeMM instructions from another external module. These instruction can contain, for example, GeMM operation operand addresses, matrix sizes, and data type information. The controller 706 may orchestrate the systolic array computation and memory read/write. Controller 706 may also send read commands and addresses to memory sub-system 710. In response, memory sub-system 710 may output data to systolic array 704 as input. The controller 706 may send addresses and read commands to memory sub-system 710 every cycle to produce the systolic array input columns. During output cycles, controller 706 may issue write commands and addresses to memory sub-system 710 to write systolic array output columns to specified memory address locations. Additionally, controller 706 may send compute control information to compute engine 702 to cause compute engine 702 to start to compute, accumulate, and output matrices in specific cycles.

Memory sub-system 710 may be a single memory for both weight and activation. Memory sub-system 710 can be separate weight and activation memories. Memory sub-system 710 may include separate weight, activation, and output memories. In some embodiments, memory sub-system 710 may support masked writes. For example, memory sub-system 710 may be a DRAM. Proprietary memory may also be designed to support masked writes.

Moreover, memory sub-system 710 may include an input/output (IO) component to receive and send bytes to compute engine 702. This IO component, or data interface, may be the same width as the systolic array output or the byte-wise mask generated by data mask generator 708.

If memory sub-system 710 has more than one physical memory, each physical memory can either have its own data mask generator, or each physical memory may share one data mask generator. The memory that is connected with data mask generator may support systolic-array-output-merge-writes.

Multiple data mask generators may be required to merge output, e.g., to write output into memory efficiently. If a memory is dedicated to weight in all scenarios, then a data mask generator may not be required for this memory because there is no need to merge weight data. However, in some embodiments, if a memory is only allocated for weight in a particular operation/run, and may be allocated otherwise, e.g., as activation memory in another operation/run, then data masks may be required to be generated for this memory.

In the embodiments of the present disclosure, a data mask generator may be shared by multiple memories as long as the memories do not need to perform masked writes simultaneously. This rationale may also apply to systems having separate weight, activation, and output memories.

In the embodiments of the present disclosure, memory sub-system 710 may correspond to local memory 2032 shown in FIG. 2B. Compute engine 702 may be the same as or similar to first operation unit 2020, where controller 706 or data mask generator 708 may be incorporated into one or more components of core 202 (e.g., sequencer 2026, instruction buffer 2028, second operation unit 2022, etc.) or can be separate components of core 202.

FIG. 8 illustrates two strides of data mask generator, e.g., data mask generator 708. As used herein, two strides means the generated mask pattern shifts two bits for every output. The two strides may be used, for example, when each number in the matrix requires two bytes to represent (for example integer 16, or floating point 16 data type). The two stride may enable the data mask generator to support multiple data types. In FIG. 8, an exemplary N bit data mask output is shown, where one bit represents a mask for one byte of data. The width of data mask output may match the output of compute 702 (e.g., the output of systolic array 704), output width, or memory IO width.

In the embodiments of the present disclosure, data mask generator 708 may use shift registers. For example, the shift register input may be "1" for m cycles and "0" for m−1 cycles, where m is the output matrix size. The shift stride "s" may equal the number of bytes of output data. For example, if the output type is integer 8, then stride is 1. If output type is integer 16, or float-point 16, or bfloat 16, the stride is 2. If output type is fp32/int32, the stride is 4, and so on, e.g., N equals m*s. In other embodiments, data mask generator 708 may be hardware or other circuitry configured to generate a bit mask. For example, data mask generator may be circuitry configured to receive a pattern generation signal from the controller (e.g., controller 706), and, based on the received signal, generate a mask corresponding to each segment of a plurality of segments of the staged output data.

Figure 9A:
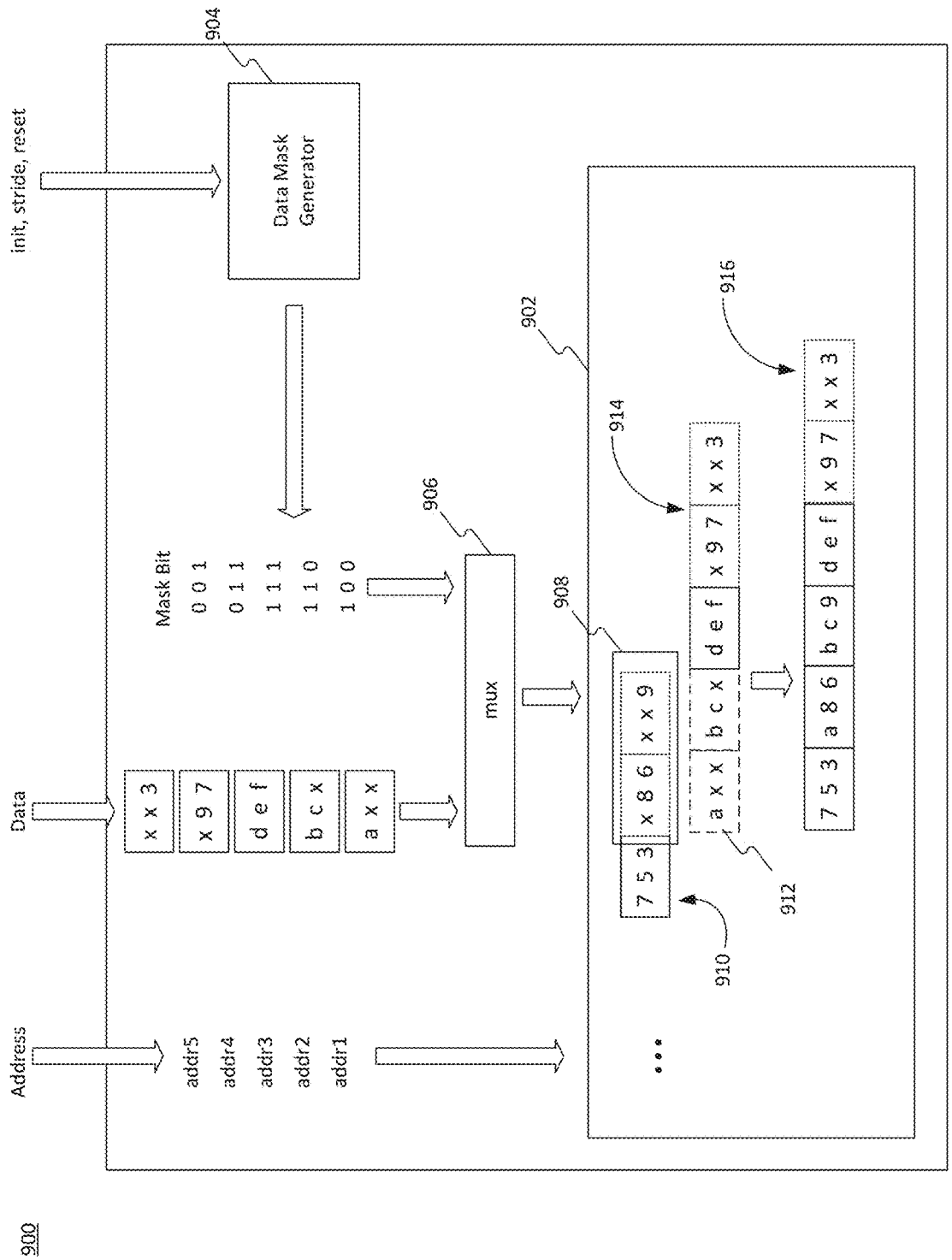
FIG. 9A illustrates another exemplary system for implementing a systolic array, consistent with embodiments of the present disclosure.

FIG. 9A is another exemplary systolic array-based accelerator 900. Accelerator 900 may include a memory 902, which supports read write operations. In the embodiments of the present disclosure, the memory may support masked write operations, meaning the memory may accept masked sequential bits. As discussed with reference to FIG. 7, a data mask generator, e.g., data mask generator 904, may receive input from a controller. The input may be a pattern generation signal configured to cause data mask generator 904 to produce a bit-wise mask.

A multiplexer (MUX) 906 may receive segments of a matrix block of data from a systolic array (not shown) and mask data from data mask generator 904. For a byte where the masked bit is 1, the corresponding data of the segment is read through to memory 902. If the masked bit of the corresponding byte is 0, the corresponding data of the segment is ignored and will not be written to the memory.

This enables masked segment data from MUX 906 to be merged and stored, such as merging tail data associated with a matrix block with head data associated with another matrix block. In particular, when memory 902 initially receives masked segment data "x 8 6" of tail 908 of first output data 910, this masked segment data can be merged with a head of different output data. In a subsequent operation, if "a x x" is received at memory 902 (i.e., data associated with mask "100"), it is merged with data at an address associated with a mask "011." Thus, a tail 908 of the first output 910 may be merged with a head 912 of the second output 914. Using this method, first output 910 and second output 914 may be merged and stored as merged data 916.

Components of accelerator 900 may be integrated into NPU architecture 200, for example, as part of a core 202, shown in FIG. 2B. For example, memory 902 may correspond to local memory 2032, while data mask generator 904 and mux 906 may be additional components of core 202 or of first operational unit 2020.

Figure 9B:
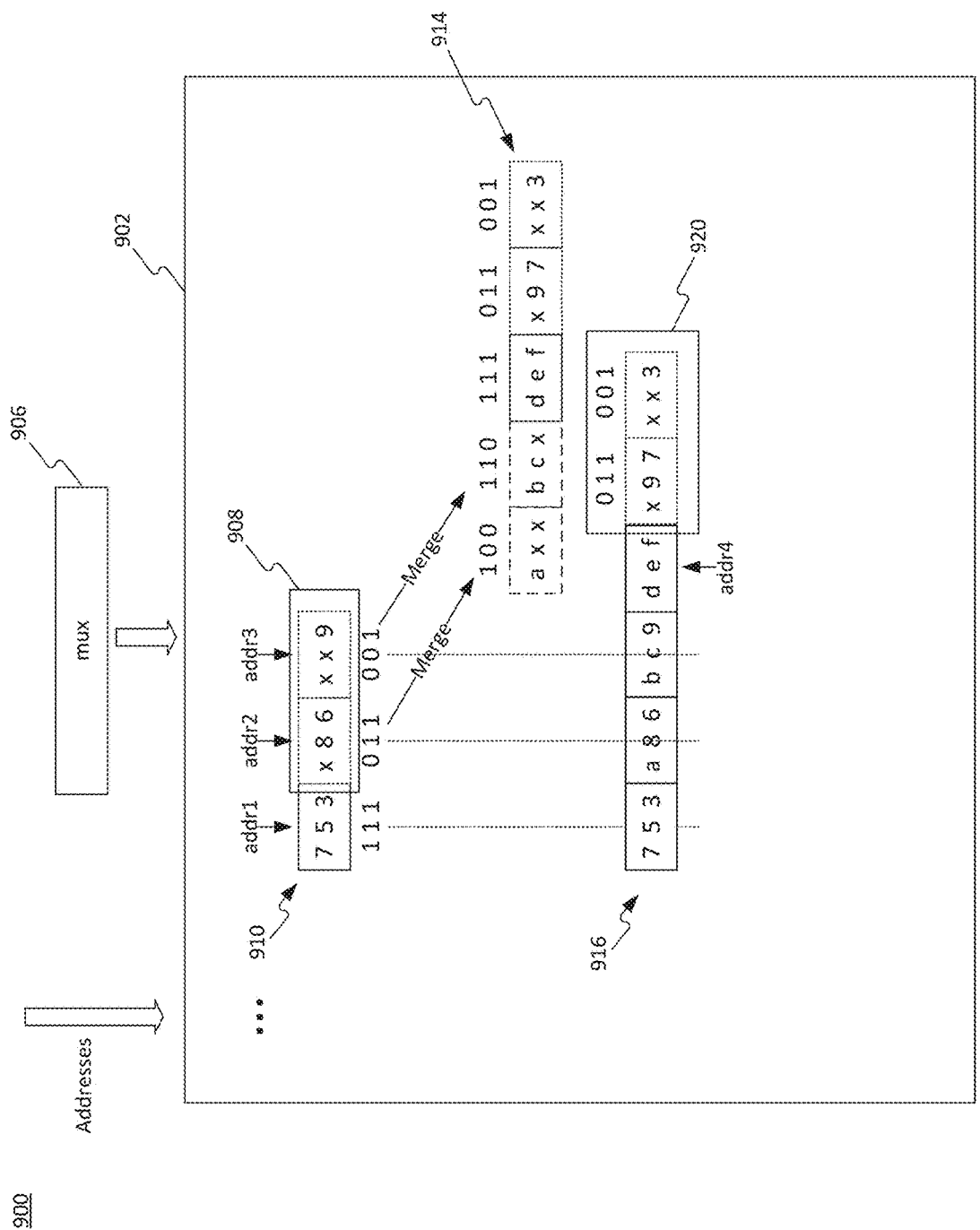
FIG. 9B illustrates an exemplary data structure, consistent with embodiments of the present disclosure.

FIG. 9B illustrates an exemplary data structure as shown in FIG. 9A with reference to memory 902. For example, memory 902 may receive addresses and data output by MUX 906, which includes output data segments based on their associated mask. In some embodiments, output by MUX 906 can include the associated masks. In some embodiments, the associated masks are not included in the output as memory 902 may have been previously configured to associate an incoming segment with a data mask. For example, if each matrix block includes five segments, then the first incoming segment of each block would correspond with mask "1 0 0," the second segment with "1 1 0," the third segment with "1 1 1," the fourth segment with "0 1 1," and the fifth segment "0 0 1." In the example shown in FIG. 9B, first output data 910 may include three data segments, with one segment associated with addr1 and mask "1 1 1," one segment associated with addr2 and mask "0 1 1," and one segment associated with mask "0 0 1."

Memory 902 may subsequently receive a second output 914 and may align data segments based on complementary masks. For example, the segment at addr2 having mask "0 0 1" may be matched with the complementary segment of the second output, which is associated with a mask of "1 1 0." The complementary segments are then merged such that each address stores useful information, e.g., no placeholder values. Thus, the resulting compressed output includes data from both the first and second output data 910 and 914, respectively. Subsequently received data may then be merged with the tail 920 of the resulting output data stream 916.

It is appreciated that while FIGS. 9A-9B show segments having three bytes of data and three corresponding mask bits, any number of bytes per segment and any number of corresponding mask bits can be used. Moreover, while the exemplary embodiments above describe a mask bit corresponding to a byte of data in a segment, it is appreciated that the mask bit can correspond to any number of bits of data in a segment.

FIG. 10 illustrates the improved efficiency of disclosed embodiments for systolic array-friendly data placement. Given an exemplary output 1002, using an accelerator such as that described with reference to FIG. 3, the memory must perform a number of reads and writes. For example, using traditional methods for staging input and output data, a system may require additional components, e.g., a component with temporary memory, to merge the data in memory with the mask bits. The system may read the column with placeholder to this temporary memory, merge the column with other data, and then write the merged data to DRAM. Thus, this merge is performed but requires additional read operations and components.

In contrast, using the methodology described with reference to FIGS. 7 and 9, the memory is only required to perform write operations, thereby improving efficiency. For example, the merging of data occurs in memory, e.g., memory sub-system 710 or memory 902, with the control of carefully generated addresses and masking write mechanism. No additional components or read operations are required to execute the merge. In traditional systems, the output columns will be written to addr1, addr2, addr3, and the next matrix output will continue to be written to addr4, addr5, addr6. Without the masking bits, the system cannot write to a previously used address because it will overwrite useful information. However, disclosed embodiments allow the system to write to previously used addr2, addr3 by only overwriting the placeholder values stored at these addresses. Accordingly, disclosed embodiments enable output data to be merged without losing useful information.

Figure 11:
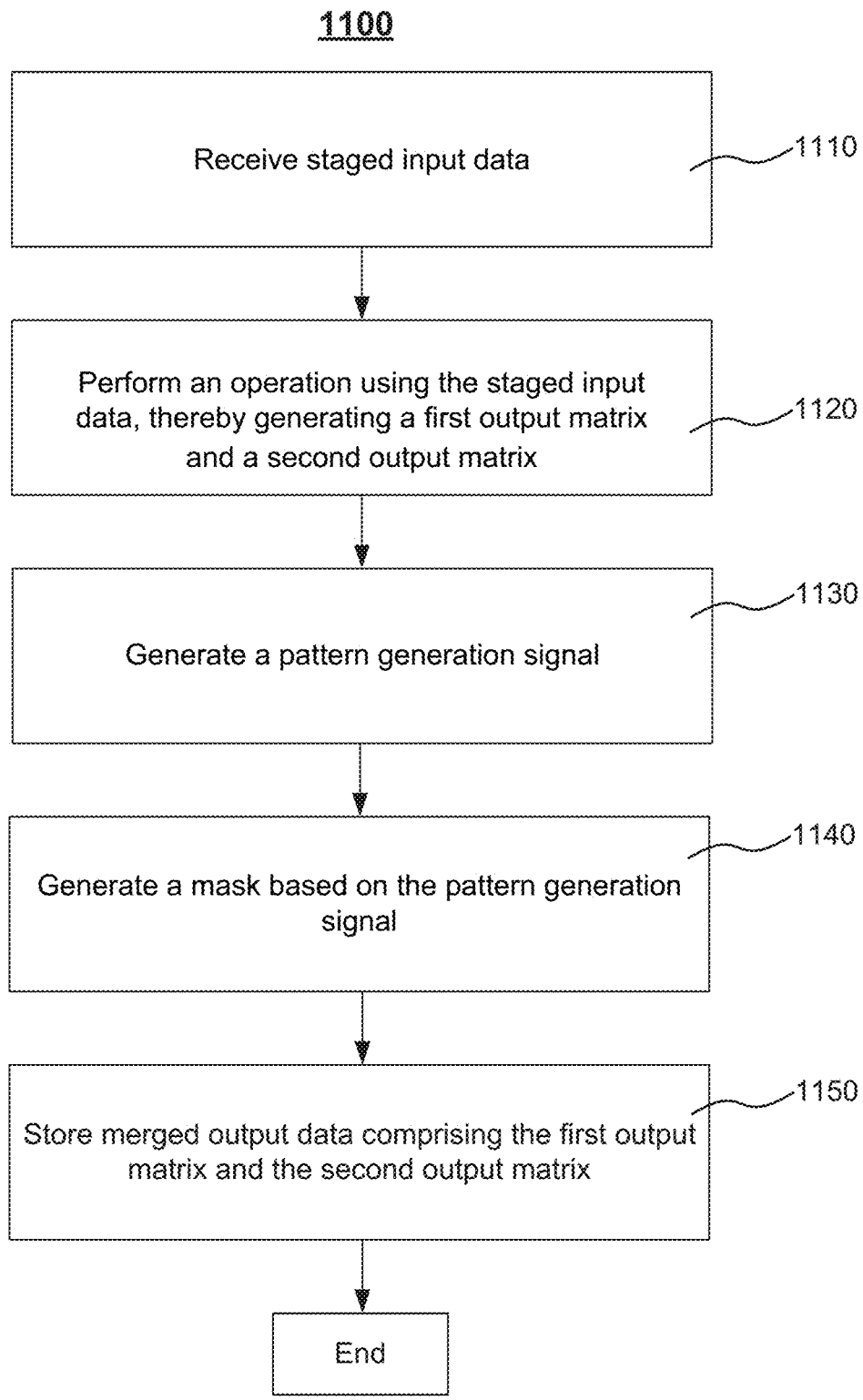
FIG. 11 illustrates a flowchart of an exemplary method for implementing a systolic array, consistent with embodiments of the present disclosure.

FIG. 11 is a flowchart of an exemplary method 1100 for generating data having systolic array-friendly placement, according to some embodiments of the present disclosure. Method 1100 can be implemented by neural network architecture 200 of FIG. 2A or FIG. 2C or core 202 of FIG. 2C. Moreover, method 1100 can also be implemented by a computer program product, embodied in a computer-readable medium, including computer-executable instructions, such as program code, executed by computers.

As shown in FIG. 11, at step 1110, a systolic array (e.g., processing array 2038, shown in FIG. 2C) may receive staged input data. As previously described, the input data may be weight data or activation data. The input data may be generated by shifting an input data stream such that each column of input data is delayed by a clock cycle.

At step 1120, the systolic array (e.g., processing array 2038, shown in FIG. 2C) may perform an operation using the staged input data, thereby generating a first output matrix and a second output matrix. The operation may be, for example, a GeMM operation.

At step 1130, the system may generate a pattern generation signal. The pattern generation signal may be generated by a controller (e.g., controller 706, shown in FIG. 7), or by other circuitry configured to generate a signal during each clock cycle.

At step 1140, the system may generate a mask based on the pattern generation signal. The mask may be generated by circuitry, for example, by a shift register, or by a data mask generator (e.g., data mask generator 708, shown in FIG. 7).

The pattern may be based on the width of the systolic array output and may be incremented based on the pattern generation signal.

At step 1150, the system may store merged output data including the first output matrix and the second output matrix. The output data may be generated by merging multiple data segments based on the mask associated with each data segment. For example, as described with reference to FIG. 9B, the tail of a first output stream may include segments storing placeholder values. This tail may be merged with the head of a subsequent output stream, where one or more segments store placeholder values in complementary positions to those in the tail of the first output stream. Accordingly, the head and tail may be merged such to generate output data that does not include any placeholder values. The merged data may be stored in a memory (e.g., memory sub-system 710, shown in FIG. 7) of the system or may be operated on by the systolic array to perform subsequent operations.

In the embodiments of the present disclosure, a method of implementing a systolic array, e.g., processing array 2038, may include fetching one or more batches of data in a first memory (e.g., memory 2032 shown in FIGS. 2B and 2C). The method may include regrouping the one or more batches of data into multiple work items. For example, a first work item may partially overlap one or more work items among the multiple work items. For example, the data stored in the one or more segments of the input data stream may partially or fully overlap (e.g., merged). The work items may be broadcasted to a processing array (e.g., processing array 2038 shown in FIG. 2C) having a number of processing strings. The first work item may be transferred to two or more processing strings of the processing array.

The embodiments of the present disclosure may include deleting a portion of the one or more batches of data when the portion of the one or more batches of data is determined not to be used in a predetermined time period. For example, the data may be deleted from the memory (e.g., memory 2032 of FIG. 2C). The system may also generate a number of outputs by the number of processing strings in parallel.

Embodiments herein include database systems, methods, and tangible non-transitory computer-readable media. The methods may be executed, for example, by at least one processor that receives instructions from a tangible non-transitory computer-readable storage medium (such as of a host system having host unit 220 and host memory 221 of FIG. 2A). Similarly, systems consistent with the present disclosure may include at least one processor and memory, and the memory may be a tangible non-transitory computer-readable storage medium. As used herein, a tangible non-transitory computer-readable storage medium refers to any type of physical memory on which information or data readable by at least one processor may be stored. Examples include random access memory (RAM), read-only memory (ROM), volatile memory, non-volatile memory, hard drives, CD ROMs, DVDs, flash drives, disks, registers, caches, and any other known physical storage medium. Singular terms, such as "memory" and "computer-readable storage medium," may additionally refer to multiple structures, such a plurality of memories or computer-readable storage media. As referred to herein, a "memory" may comprise any type of computer-readable storage medium unless otherwise specified. A computer-readable storage medium may store instructions for execution by at least one processor, including instructions for causing the processor to perform steps or stages consistent with embodiments herein. Additionally, one or more computer-readable storage media may be utilized in implementing a computer-implemented method. The term "non-transitory computer-readable storage medium" should be understood to include tangible items and exclude carrier waves and transient signals.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

The embodiments may further be described using the following clauses:

1. An accelerator comprising:
   a systolic array comprising a plurality of operation units, wherein the systolic array is configured to receive staged input data and perform operations using the staged input to generate staged output data, the staged output data comprising a number of segments;
   a controller configured to execute one or more instructions to generate a pattern generation signal;
   a data mask generator including circuitry configured to:
   receive the pattern generation signal from the controller, and
   based on the received signal, generate a mask corresponding to each segment of the staged output data; and
   a memory configured to store the staged output data using the generated masks.
2. The accelerator of clause 1, wherein the data mask generator comprises a shift register.
3. The accelerator of clause 1 or 2, wherein the pattern generation signal causes the data mask generator to execute a stride based on a type of the output data.
4. The accelerator of any of clauses 1-3, wherein the mask has a width equal to an output width of the systolic array.
5. The accelerator of any of clauses 1-4, wherein the memory is a dynamic random-access memory.
6. The accelerator of any of clauses 1-5, wherein each of the plurality of processing units is a multiply-accumulate unit.
7. The accelerator of any of clauses 1-6, wherein the data mask generator is further configured to generate the mask for 2n−1 consecutive writes.
8. The accelerator of any of clauses 1-7, wherein the memory is further configured to store merged output data, wherein the output data is merged with previous data output by the systolic array based on the mask associated with each segment of the staged output data.
9. The accelerator of clause 8, wherein the systolic array is further configured to: receive the merged output data, and
   perform a subsequent calculation using the merged output data.
10. The accelerator of clause 8, wherein the staged output data comprises a first data stream having a tail segment associated with a first mask and a second data stream having a head segment associated with a second mask.
11. The accelerator of clause 10, wherein the merged output data is generated by combining the tail segment of the first data stream and the head segment of the second data stream based on the combination of the first and second masks.
12. A method for systolic array-friendly data placement, comprising:

receiving, by a systolic array, staged input data,
performing an operation using the staged input data, thereby generating a first output matrix and a second output matrix;
generating a pattern generation signal;
generating a mask based on the pattern generation signal; and
storing merged output data comprising the first output matrix and the second output matrix.

13. The method of clause 12, wherein the operation performed by the systolic array comprises a general matrix multiply (GeMM) operation.

14. The method of either of clause 12 or 13, wherein the staged input data comprises one of: activation data or weight data.

15. The method of any of clauses 12-14, further comprising:
performing, by the systolic array, a second operation on the merged output data.

16. The method of any of clauses 12-15, the staged input data is generated by shifting input data such that each column of input data is delayed by a clock cycle.

17. The method of any of clauses 12-16, wherein the pattern generation signal is based on a type of data output by the systolic array.

18. The method of any of clauses 12-17, further comprising:
deleting a portion of the one or more batches of data when the portion of the one or more batches of data is determined not to be used in a predetermined time period 19. The method of any of clauses 12-18, further comprising: generating a plurality of outputs by the plurality of processing strings in parallel.

20. A non-transitory computer readable storage medium storing a set of instructions that are executable by at least one processor of a computing device to cause the computing device to perform a method for executing a convolutional neural network operation, the method comprising:
fetching one or more batches of data in a first memory;
regrouping the one or more batches of data into multiple work items, wherein a first work item partially overlaps one or more work items among the multiple work items; and
broadcasting the multiple work items to a processing array comprising a plurality of processing strings, wherein the first work item is transferred to two or more processing strings of the processing array.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. An accelerator comprising:
a systolic array comprising a plurality of operation units, wherein the systolic array is configured to receive staged input data and perform operations using the staged input to generate staged output data, the staged output data comprising a number of segments;
a controller configured to execute one or more instructions to generate a pattern generation signal based on a type of data output by the systolic array;
a data mask generator including circuitry configured to:
receive the pattern generation signal from the controller, and
based on the received signal, generate a mask corresponding to each segment of the staged output data; and
a memory configured to store the staged output data using the generated masks,
wherein the staged output data comprises a first output data and a second output data, the memory is configured to store merged output data of the first output data and the second output data, and the merged output data includes a merged output segment generated by combining a tail segment from the first output data and a head segment from the second output data when the tail segment and the head segment have complementary masks,
wherein the tail segment is associated with a first mask indicating at least one placeholder value in the tail segment and the head segment is associated with a second mask indicating at least one placeholder value in the head segment, and the merged output segment generated by combining the tail segment and the head segment does not include any placeholder value.

2. The accelerator of claim 1, wherein the data mask generator comprises a shift register.

3. The accelerator of claim 1, wherein the pattern generation signal causes the data mask generator to execute a stride based on a type of the output data.

4. The accelerator of claim 1, wherein the mask has a width equal to an output width of the systolic array.

5. The accelerator of claim 1, wherein the memory is a dynamic random-access memory.

6. The accelerator of claim 1, wherein each of the plurality of processing units is a multiply-accumulate unit.

7. The accelerator of claim 1, wherein the data mask generator is further configured to generate the mask for 2n−1 consecutive writes.

8. The accelerator of claim 1, wherein the systolic array is further configured to:
receive the merged output data, and
perform a subsequent calculation using the merged output data.

9. The accelerator of claim 1, wherein the first mask and the second mask have complementary mask patterns.

* * * * *